United States Patent
Suau et al.

(10) Patent No.: US 8,445,579 B2
(45) Date of Patent: May 21, 2013

(54) USE IN A PAINT OF A DRY-GROUND CALCIUM CARBONATE WITH A COPOLYMER OF (METH)ACRYLIC ACID WITH AN ALKOXY OR HYDROXY POLYALKYLENEGLYCOL GROUP

(75) Inventors: Jean-Marc Suau, Lucenay (FR); Jacques Mongoin, Quincieux (FR); Denis Ruhlmann, Genay (FR); Olivier Guerret, La Tour de Salvagny (FR)

(73) Assignee: Coatex S.A.S., Genay (FR)

( * ) Notice: Subject to any disclaimer, the term of this patent is extended or adjusted under 35 U.S.C. 154(b) by 40 days.

(21) Appl. No.: 13/470,882

(22) Filed: May 14, 2012

(65) Prior Publication Data

US 2012/0225988 A1    Sep. 6, 2012

Related U.S. Application Data

(63) Continuation of application No. 13/226,879, filed on Sep. 7, 2011, which is a continuation of application No. 12/523,207, filed as application No. PCT/IB2008/000532 on Feb. 26, 2008, now abandoned.

(30) Foreign Application Priority Data

Mar. 5, 2007 (FR) ..................................... 07 01595

(51) Int. Cl.
*C08K 3/14* (2006.01)
*C08K 3/22* (2006.01)
*C01F 11/18* (2006.01)

(52) U.S. Cl.
USPC .......................................... 524/436; 423/430

(58) Field of Classification Search
USPC .......................................... 524/436; 423/430
See application file for complete search history.

(56) References Cited

U.S. PATENT DOCUMENTS

| | | | |
|---|---|---|---|
| 4,013,602 A | 3/1977 | Delfosse et al. | |
| 5,145,902 A | 9/1992 | Ravet et al. | |
| 2004/0019148 A1 | 1/2004 | Suau et al. | |
| 2009/0312459 A1 | 12/2009 | Gane et al. | |
| 2009/0326101 A1 | 12/2009 | Suau et al. | |
| 2010/0076139 A1 | 3/2010 | Mongoin et al. | |
| 2010/0111809 A1 | 5/2010 | Suau et al. | |
| 2011/0319526 A1 | 12/2011 | Suau et al. | |
| 2011/0319544 A1 | 12/2011 | Suau et al. | |
| 2012/0053280 A1 | 3/2012 | Mongoin et al. | |

FOREIGN PATENT DOCUMENTS

| | | |
|---|---|---|
| EP | 0 412 027 | 2/1991 |
| JP | 01-151955 | 6/1989 |
| JP | 10 338518 | 12/1998 |
| WO | 01 96007 | 12/2001 |

OTHER PUBLICATIONS

Prescott, P.I.; Pruett, R.J. "Ground calcium carbonate: Ore mineralogy, processing and markets." Mining Engineering, Jun. 1996, 79-84.
U.S. Appl. No. 13/478,168, filed May 23, 2012, Suau, et al.

*Primary Examiner* — John Uselding
(74) *Attorney, Agent, or Firm* — Oblon, Spivak, McClelland, Maier & Neustadt, L.L.P.

(57) ABSTRACT

Provided is a method of producing a paint involving dry-grinding a calcium carbonate in the presence of a grinding aid agent which is a copolymer of (meth)acrylic acid with a monomer containing an alkoxy or hydroxy polyalkyleneglycol group.

22 Claims, No Drawings

USE IN A PAINT OF A DRY-GROUND CALCIUM CARBONATE WITH A COPOLYMER OF (METH)ACRYLIC ACID WITH AN ALKOXY OR HYDROXY POLYALKYLENEGLYCOL GROUP

CROSS REFERENCE TO RELATED APPLICATIONS

The present application is a continuing application based on U.S. application Ser. No. 13/226,879, which itself was a continuing application based on U.S. application Ser. No. 12/523,207, which was the national stage of international application PCT/IB2008/000532, filed on Feb. 26, 2008, published under WO 2008/107786, claiming the benefit of the filing date of French Application No. 0701595, filed on Mar. 5, 2007, the text of each of which is also incorporated by reference.

The present invention concerns the field of paints, where the said paints contain at least one mineral matter which is a calcium carbonate obtained by dry grinding.

Grinding using a dry process (as opposed to in an aqueous medium) of calcium carbonate is described in the documents "Beitrag zur Aufklärung der Wirkungsweise von Mahlhilfsmitteln" ("Freiberger Forschungshefte" VEB Deutscher Verlag für Grundstoffindustrie, Leipzig, Germany (1975)). and "Calcium Carbonate" (Birkhäuser Verlag, 2001).

This grinding, which leads to a reduction in the sizes of the individual particles of calcium carbonate by mechanical action, is assisted by grinding agents which can be classified into the following 3 categories.

The first comprises the weak acids (formic, acetic, lactic, adipic as mentioned in document FR 2 863 914, or stearic as indicated in document EP 0 510 890), and their salts (sodium lignin sulfonate, sodium acetate, etc.). The second includes the weak bases, and notably the amines (see document GB 2 179 268). The third, and the most commonly used, since it is the most effective, includes the glycol-based alcohols, including notably diethylene glycol illustrated in documents WO 2002/081 573 and US 2003/019 399.

Although they are still the most effective, the latter lead to calcium carbonates with a high quantity of volatile organic compounds (VOCs). For this reason, finding an alternative solution to these glycol-based grinding aid agents which is at least as effective as them in terms of the final application would constitute a major contribution to the state of the technique.

With this regard, a first object of the invention consists in the use, in a paint, of a calcium carbonate characterised in that the said carbonate is dry-ground in the presence of a grinding aid agent, firstly, and in that the grinding aid agent is, secondly, a copolymer, consisting:

a) of at least one anionic monomer chosen from among acrylic acid, methacrylic acid and their blends, b) and of at least one non-ionic monomer, of formula (I):

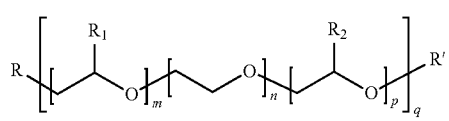

where:

m, n, p and q are integers such that: m, n, p≦150, q≧1, and 5≦(m+n+p)q≦150, and preferentially 15≦(m+n+p)q≦120, $R_1$ represents hydrogen or the methyl or ethyl radical, $R_2$ represents hydrogen or the methyl or ethyl radical, R represents a radical containing an unsaturated polymerisable function, preferentially belonging to the group of vinylics, or to the group of acrylic, methacrylic, maleic esters, or to the group of unsaturated urethanes such as acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides, or again to the group constituted by acrylamide and methacrylamide, R' represents hydrogen or a hydrocarbonated radical with 1 to 40 carbon atoms, preferentially 1 to 4 carbon atoms, where R' is very preferentially the methyl radical, or a blend of several monomers of formula (I), c) and possibly of at least one other monomer chosen from among (meth)acrylic anhydride, (meth)acrylamide, or from among the (meth)acrylic esters, such as preferentially the acrylates and methacrylates with 1 to 20 carbon atoms in their ester radical, such as very preferentially the methyl, ethyl, isopropyl, n-propyl, isobutyl, n-butyl, ter-butyl or 2-ethylhexyl acrylates, the methyl or ethyl methacrylates, the hydroxylated methacrylates such as the hydroxyethyl and hydroxypropyl methacrylates, or from among the aromatic vinylic monomers such as preferentially styrene, α-methylstyrene, styrene sulfonate, or acrylamido-2-methyl-2-propane-sulfonic acid, or from among the organophosphate monomers, such as preferentially the acrylate and methacrylate phosphates of ethylene glycol, or the acrylate and methacrylate phosphates of oxyethylene and/or oxypropylene glycol, and their blends.

This grinding aid agent may be designated using the expression of a copolymer of methacrylic acid with a monomer containing an alcoxy or hydroxy polyalkyleneglycol group.

The examples of the present Application show that, in comparison with a calcium carbonate which is dry ground with a diethylene glycol, a calcium carbonate according to the invention enables a cement to be obtained with a much higher degree of spreading.

This use is also characterised in that the said copolymer consists, expressed as a percentage by weight of the monomers (the sum of the percentages by weight of all the monomers equals 100%):

a) 0.5% to 50%, preferentially 1% to 25%, and very preferentially 5% to 20%, of at least one anionic monomer chosen from among acrylic acid, methacrylic acid and their blends, b) of 50% to 99.5%, preferentially 75% to 99%, and very preferentially 80% to 95%, of at least one non-ionic monomer, of formula (I):

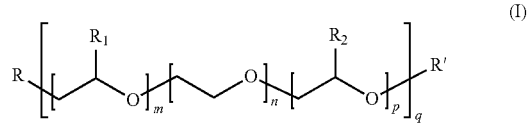

where:
- m, n, p and q are integers such that: m, n, p≦150, q≧1, and 5≦(m+n+p)q≦150, and preferentially 15≦(m+n+p)q≦120,
- $R_1$ represents hydrogen or the methyl or ethyl radical,
- $R_2$ represents hydrogen or the methyl or ethyl radical,
- R represents a radical containing an unsaturated polymerisable function, preferentially belonging to the group of vinylics, or to the group of acrylic, methacrylic, maleic esters, or to the group of unsaturated urethanes such as acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides, or again to the group constituted by acrylamide and methacrylamide,
- R' represents hydrogen or a hydrocarbonated radical with 1 to 40 carbon atoms, preferentially 1 to 4 carbon atoms, where R' is very preferentially the methyl radical,
or a blend of several monomers of formula (I),
c) 0% to 50% of at least one other monomer chosen from among (meth)acrylic anhydride, (meth)acrylamide, or from among the (meth)acrylic esters, such as preferentially the acrylates and methacrylates with 1 to 20 carbon atoms in their ester radical, such as very preferentially the methyl, ethyl, isopropyl, n-propyl, isobutyl, n-butyl, ter-butyl or 2-ethylhexyl acrylates, the methyl or ethyl methacrylates, the hydroxylated methacrylates such as the hydroxyethyl and hydroxypropyl methacrylates, or from among the aromatic vinylic monomers such as preferentially styrene, α-methylstyrene, styrene sulfonate, or acrylamido-2-methyl-2-propane-sulfonic acid, or from among the organophosphate monomers, such as preferentially the acrylate and methacrylate phosphates of ethylene glycol, or the acrylate and methacrylate phosphates of oxyethylene and/or oxypropylene glycol, and their blends.

This use is also characterised in that the said copolymer is obtained in the acidic form and possibly distilled, and is possibly partially or totally neutralised by one or more neutralisation agents having a monovalent or polyvalent cation, where the said agents are chosen preferentially from among ammonia or from among calcium, magnesium hydroxides and/or oxides, or from among sodium, potassium or lithium hydroxides, or from among the aliphatic and/or cyclic primary, secondary or tertiary amines, such as preferentially stearylamine, the ethanolamines (mono-, di- and triethanolamine), mono- and diethylamine, cyclohexylamine, methylcyclohexylamine, amino methyl propanol, morpholine, and preferentially in that the neutralisation agent is chosen from among triethanolamine and sodium hydroxide.

This use is also characterised in that the said copolymer is obtained by processes of radical polymerisation in solution, in a direct or reverse emulsion, in suspension or precipitation in solvents, in the presence of catalytic systems and chain transfer agents, or again by processes of controlled radical polymerisation, and preferentially by nitroxide mediated polymerisation (NMP) or by cobaloximes, by atom transfer radical polymerisation (ATRP), by controlled radical polymerisation by sulphurated derivatives, chosen from among carbamates, dithioesters or trithiocarbonates (RAFT) or xanthates. This use is also characterised in that the said copolymer may possibly, before or after the total or partial neutralisation reaction, be treated and separated into several phases, according to static or dynamic processes known to the skilled man in the art, by one or more polar solvents belonging preferentially to the group constituted by water, methanol, ethanol, propanol, isopropanol, the butanols, acetone and tetrahydrofuran or their blends.

One of the phases then corresponds to the polymer used according to the invention.

This use is also characterised in that 0.05% to 5%, preferentially 0.1% to 3%, and very preferentially 0.1% to 1%, by dry weight of the said copolymer relative to the dry weight of calcium carbonate is used during the dry grinding of the said carbonate.

A second purpose of the invention consists of the paints obtained by the use of dry-ground calcium carbonate according to the invention.

EXAMPLES

In these examples, all the grinding operations are undertaken according to a method well known to the skilled man in the art (document FR 2 901 491 describes such a method). We shall confine ourselves here to indicating the final granulometry of the particles of calcium carbonate obtained after grinding (the skilled man in the art in reality knows how to modify the parameters of the process with a view to obtaining such a granulometry; however, one may also refer to the above-mentioned document).

In each of the tests n° 1 to 4, a matt paint is produced in aqueous phase by blending whilst stirring of the different constituents, in the proportions in grams as indicated in table 1.

| Test n° | 1 | 2 | 3 | 4 |
|---|---|---|---|---|
| Prior Art (PA)/Invention (IN) | PA | IN | PA | IN |
| Water | 292.0 | 292.0 | 292.0 | 292.0 |
| Ammonium hydroxide (31% solution) | 2.0 | 2.0 | 2.0 | 2.0 |
| Coatex ™ P90 (40% solution) | 4.0 | 4.0 | 4.0 | 4.0 |
| Mergal ™ K6N | 2.0 | 2.0 | 2.0 | 2.0 |
| Byk ™ 034 | 2.0 | 2.0 | 2.0 | 2.0 |
| TiO2 RL68 | 41.0 | 41.0 | 41.0 | 41.0 |
| Omyacoat ™ 850 OG | 215.0 | 215.0 | 215.0 | 215.0 |
| CaCO3 dry ground according to test n° 1 | 328.0 | 0 | 0 | 0 |
| CaCO3 dry ground according to test n° 2 | 0 | 328.0 | 0 | 0 |
| CaCO3 dry ground according to test n° 3 | 0 | 0 | 328.0 | 0 |
| CaCO3 dry ground according to test n° 4 | 0 | 0 | 0 | 328.0 |
| Acronal ™ 290D | 82.0 | 82.0 | 82.0 | 82.0 |
| Monoethylene glycol | 10.0 | 10.0 | 10.0 | 10.0 |
| Texanol ™ | 10.0 | 10.0 | 10.0 | 10.0 |
| Rheo ™ 3000 | 12.0 | 12.0 | 12.0 | 12.0 |
| Total (g) | 1000.0 | 1000.0 | 1000.0 | 1000.0 |

Coatex ™ P90 designates a thickener sold by the company COATEX ™,
Rheo ™ 3000 designates a thickener sold by the company COATEX ™,
Mergal ™ K6N designates a bactericide sold by the company TROY ™,
Byk ™ 034 designates an anti-foaming agent sold by the company BYK ™,
TiO2 RL68 designates a titanium dioxide powder sold by the company MILLENIUM ™,
Omyacoat ™ 850 OG designates a calcium carbonate sold by the company OMYA ™,
Acronal ™ 290 D designates a binder sold by the company BASF ™,
Texanol ™ designates a coalescence agent sold by the company EASTMANN ™

Test No. 1

This test illustrates the prior art and uses a calcium carbonate obtained by dry grinding in the presence of 3000 ppm (relative to the dry weight of calcium carbonate) of a grinding agent of the prior art, which is diethylene glycol.

After grinding a calcium carbonate is obtained, 73.8% and 48.5% by weight of the particles of which have an average diameter lower respectively than 2 µm and 1 µm (as measured using a Sedigraph™ 5100).

Test No. 2

This test illustrates an embodiment of the invention and uses a calcium carbonate obtained by dry grinding in the presence of 3000 ppm (relative to the dry weight of calcium carbonate) of a grinding agent of the invention which is a polymer consisting, by weight percentage, 81.5% of methoxy polyethylene glycol methacrylate of molecular weight 2000, 4.9% of methacrylic acid, and 13.6% of acrylic acid.

Test No. 3

This test illustrates the prior art and uses a calcium carbonate obtained by dry grinding in the presence of 1400 ppm (relative to the dry weight of calcium carbonate) of a grinding agent of the prior art, which is diethylene glycol.

After grinding a calcium carbonate is obtained, 47.1% and 30.0% by weight of the particles of which have an average diameter lower respectively than 2 µm and 1 µm (as measured using a Sedigraph™ 5100).

Test No. 4

This test illustrates an embodiment of the invention and uses a calcium carbonate obtained by dry grinding in the presence of 1400 ppm (relative to the dry weight of calcium carbonate) of a grinding agent of the invention which is a polymer consisting, by weight percentage, 81.5% of methoxy polyethylene glycol methacrylate of molecular weight 2000, 4.9% of methacrylic acid, and 13.6% of acrylic acid.

The polymer used in tests n° 2 and 4 is obtained by polymerisation techniques well known to the skilled man in the art.

In a first beaker the following are introduced at ambient temperature and whilst stirring: 259.02 of methoxy polyethylene glycol methacrylate of molecular weight equal to 2000 g/mol, a solution containing 15.36 g of methacrylic acid and 274.39 g of water, a solution containing 69.86 g of untreated water and 50.25 g of acrylic acid In a second beaker the following are introduced at ambient temperature and whilst stirring: 2.38 g of thiolactic acid (of 98.5% mass purity) and 52.14 g of water.

In a third beaker the following are introduced at ambient temperature and whilst stirring: 2.84 g of ammonium persulphate $(NH_4)_2S_2O_8$ and 51.90 g of water.

In a fourth beaker the following are introduced at ambient temperature and whilst stirring: 0.56 g of ammonium persulphate $(NH_4)_2S_2O_8$ and 10.87 g of water.

In a single-casing cylindrical reactor, surmounted by a refrigerating column, by an anchor stirring system and 3 inlets, 351.39 g of water and 295.61 g of isopropanol are introduced. The reactive medium is heated whilst stirring (230 rpm) to 84±2° C. The contents of the first 3 beakers are introduced into the reactive medium in 2 hours. The introduction nozzles are then rinsed with 20.84 g of water (this water goes directly into the reactive medium). The solution of the $4^{th}$ beaker is then added to the reactive medium, and the blend is fired for 1 hour at 84±2° C. (at 230 rpm). At the end of the reaction the device is rinsed with 52.13 g of water. The temperature is then raised and 604.78 g is distilled. The temperature is brought down to between 50 and 60° C., and 69.34 g of sodium hydroxide at 50% mass in water is added to the reactive medium. Finally the medium is diluted with 20.85 g of water. It is cooled again before obtaining the polymer of the invention.

For each of the tests n° 1 to 4, the Stormer™, ICI™ and Brookfield™ viscosities were determined according to the methods well known to the skilled man in the art.

Certain optical characteristics of the paints obtained were also measured, such as notably L whiteness, the "3 Hunterlab filters" Sub-tone, covering power or contrast ratio, and the level of brightness at angles equal to 60° and 85°.

The methods used are notably described in document FR 2 872 815.

The results are shown in tables 2 and 3.

TABLE 2

| Viscosities | | Test n° 1 | Test n° 2 | Test n° 3 | Test n° 4 |
|---|---|---|---|---|---|
| Time t = 0 | $\mu^I$ (P) | 1.9 | 1.9 | 1.6 | 1.6 |
| | $\mu^S$(K · U) | 102 | 106 | 99 | 100 |
| | $\mu^B_{10}$ (mPa · s) | 13700 | 15100 | 11600 | 11100 |
| | $\mu^B_{100}$ (mPa · s) | 3300 | 3600 | 2900 | 3000 |
| Time t = 24 hours | $\mu^B_{10}$ (mPa · s) | 18900 | 18400 | 12700 | 12300 |
| | $\mu^B_{100}$ (mPa · s) | 4900 | 4750 | 3500 | 3100 |
| Instant t = 7 days 50° C. | $\mu^B_{10}$ (mPa · s) | 43900 | 32100 | 15400 | 12800 |
| | $\mu^B_{10}$ (mPa · s) | 14000 | 8340 | 4500 | 3200 |
| Instant t = 1 month 50° C. | $\mu^B_{10}$ (mPa · s) | Taken in mass | 42800 | 15800 | 13800 |
| | $\mu^B_{10}$ (mPa · s) | | 12000 | 4700 | 3400 |

$\mu^I$ (P): ICI ™ viscosity
$\mu^S$(K · U): Stormer ™ viscosity
$\mu^B_{10}$ (mPa · s): Brookfield ™ viscosity determined at 10 revolutions per minute
$\mu^B_{100}$ (mPa · s): Brookfield ™ viscosity determined at 100 revolutions per minute

TABLE 3

| Test n° | 1 | 2 | 3 | 4 |
|---|---|---|---|---|
| Whiteness. Measurement of the "L" | 99.2 | 99.1 | 98.7 | 98.6 |
| "3 Hunterlab filters" Sub-tone Value of b | 2.2 | 2.3 | 2.3 | 2.2 |
| Covering power of dry film Contrast ratio RC = Yn/Yb | 96.9% | 96.8% | 96.0% | 95.9% |
| Level of brightness t = 72 h | | | | |
| 60° | 4.7 | 4.6 | 4.8 | 4.7 |
| 85° | 32.9 | 33.5 | 14.9 | 15.6 |

By comparing the tests 2 by 2 (1 to 2, and 3 to 4), it is observed that the optical properties of the paint films are in the context of the invention at the same level as for the prior art.

Conversely, a clear drift of the Brookfield™ viscosity is observed in the case of paints formulated according to the prior art. At the same time, this viscosity remains much more stable in the context of the invention.

We have therefore succeeded in developing a dry-ground calcium carbonate which, in the paint field, has a more stable Brookfield viscosity, without modifying the optical properties of the dry film.

The invention claimed is:

1. A method of preparing a paint, the method comprising: dry-grinding a calcium carbonate in the presence of a grinding aid agent comprising a copolymer comprising:
a) an anionic monomer comprising acrylic acid methacrylic acid, or a mixture thereof;
b) a non-ionic monomer of formula (I)

$$\left[ R \left\{ \begin{array}{c} R_1 \\ \vdots \\ O \end{array} \right\}_m \left\{ O \right\}_n \left\{ \begin{array}{c} R_2 \\ \vdots \\ O \end{array} \right\}_p \right]_q R', \tag{I}$$

wherein
- m, n, p, and q are integers such that m, n, and p≦150, q≧1, and 5≦(m+n+p) q≦150,
- $R_1$ and $R_2$ are independently hydrogen, methyl, or ethyl,
- R is a radical comprising an unsaturated polymerizable function selected from the group consisting of a vinylic, an acrylic ester, a methacrylic ester, a maleic ester, an acrylurethane, a methacrylurethane, an α-α' dimethyl-isopropenyl-benzylurethane, an allylurethane, an optionally substituted allylic ether, an optionally substituted vinylic ether, an ethylenically unsaturated amide, an ethylenically unsaturated imide, an acrylamide, and a methacrylamide;
- R' is hydrogen or a hydrocarbon radical comprising 1 to 40 carbon atoms; and
- c) optionally, a further monomer selected from the group consisting of (meth)acrylic anhydride, a (meth)acrylamide, an acrylate comprising 1 to 20 carbon atoms in its ester radical, a methacrylate with 1 to 20 carbon atoms in its ester radical, a hydroxylated methacrylate, an aromatic vinylic monomer, an acrylate phosphate of ethylene glycol, an acrylate phosphate of oxyethylene glycol, an acrylate phosphate of oxypropylene glycol, an acrylate phosphate of oxyethylene and oxypropylene glycol, a methacrylate phosphate of ethylene glycol, a methacrylate phosphate of oxyethylene glycol, a methacrylate phosphate of oxypropylene glycol, and a methacrylate phosphate of oxyethylene and oxypropylene glycol.

2. The method of claim 1, wherein the copolymer comprises, expressed as a percentage by weight of the monomers, in which a sum of percentages by weight of all the monomers equals 100%:
a) 0.5% to 50% of the anionic monomer;
b) 50% to 99.5% of the non-ionic monomer of formula (I); and
c) 0% to 50% of the further monomer.

3. The method of claim 1, wherein the copolymer is in acidic form and optionally distilled, and is, optionally, partially or totally neutralized by at least one neutralization agent having a monovalent or polyvalent cation,
wherein the neutralization agent is at least one selected from the group consisting of ammonia, calcium hydroxide, calcium oxide, magnesium hydroxide, magnesium oxide, sodium hydroxide, potassium hydroxide, lithium hydroxide, an aliphatic primary amine, an aliphatic secondary amine, an aliphatic tertiary amine, a cyclic secondary amine, and a cyclic tertiary amine.

4. The method of claim 1, wherein the copolymer is obtained by radical polymerization.

5. The method of claim 3, comprising, prior to the grinding: at least partially neutralizing the copolymer.

6. The method of claim 1, wherein 0.05% to 5% by dry weight of the copolymer relative to a dry weight of calcium carbonate is present during the dry grinding of the calcium carbonate.

7. The method of claim 1, wherein, in the copolymer, m, n, p, and q are integers such that 15≦(m+n+p)q≦120.

8. The method of claim 1, wherein, in the copolymer, R' is a hydrocarbon radical comprising 1 to 4 carbon atoms.

9. The method of claim 1, wherein, in the copolymer, R' is a methyl radical.

10. The method of claim 1, wherein, in the copolymer, the further monomer is present and is methyl acrylate, ethyl acrylate, isopropyl acrylate, n-propyl acrylate, isobutyl acrylate, n-butyl acrylate, tert-butyl acrylate, 2-ethylhexyl acrylate, methyl methacrylate, or ethyl methacrylate.

11. The method of claim 1, wherein, in the copolymer, the further monomer is present and is hydroxyethyl methacrylate, hydroxypropyl methacrylate, styrene, α-methylstyrene, styrene sulfonate, or acrylamido-2-methyl-2-propane-sulfonic acid.

12. The method of claim 1, wherein, in the copolymer, the further monomer is present and is an acrylate phosphate of ethylene glycol, a methacrylate phosphate of ethylene glycol, an acrylate phosphate of oxyethylene glycol, an acrylate phosphate of oxypropylene glycol, an acrylate phosphate of oxyethylene and oxypropylene glycol, a methacrylate phosphate of oxyethylene glycol, a methacrylate phosphate of oxypropylene glycol, or a methacrylate phosphate of oxyethylene and oxypropylene glycol.

13. The method of claim 2, wherein the anionic monomer is present in 1% to 25% by weight.

14. The method of claim 2, wherein the anionic monomer is present in 5% to 20% by weight.

15. The method of claim 2, wherein the non-ionic monomer of formula (I) is present in 75% to 99% by weight.

16. The method of claim 2, wherein the non-ionic monomer of formula (I) is present in 80% to 95% by weight.

17. The method of claim 1, wherein 0.1% to 3% by dry weight of the copolymer relative to a dry weight of the calcium carbonate is present in the dry grinding.

18. The method of claim 1, wherein 0.1% to 1% by dry weight of the copolymer relative to a dry weight of the calcium carbonate is present in the dry grinding.

19. The method of claim 1, wherein 1% to 5% by dry weight of the copolymer relative to a dry weight of the calcium carbonate is present in the dry grinding.

20. The method of claim 1, wherein the copolymer is partially or totally neutralized and the neutralization agent is triethanolamine or sodium hydroxide.

21. The method of claim 1, wherein, in the non-ionic monomer of formula (I) in the copolymer, m and n≧1, and R' is a hydrocarbon radical comprising 1 to 4 carbon atoms.

22. The method of claim 1, further comprising distilling the copolymer before the dry grinding.

* * * * *